(12) United States Patent
Igarashi et al.

(10) Patent No.: US 9,194,483 B2
(45) Date of Patent: Nov. 24, 2015

(54) LUBRICATING STRUCTURE OF TRANSMISSION

(71) Applicant: HONDA MOTOR CO., LTD., Tokyo (JP)

(72) Inventors: Tatsuya Igarashi, Saitama (JP); Yuji Kubota, Saitama (JP); Hisayuki Asada, Saitama (JP); Shin Fukasawa, Saitama (JP); Joko Karasawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/345,142

(22) PCT Filed: Oct. 4, 2012

(86) PCT No.: PCT/JP2012/075799
§ 371 (c)(1),
(2) Date: Mar. 14, 2014

(87) PCT Pub. No.: WO2013/077092
PCT Pub. Date: May 30, 2013

(65) Prior Publication Data
US 2014/0342868 A1     Nov. 20, 2014

(30) Foreign Application Priority Data
Nov. 24, 2011  (JP) ................. 2011-256345

(51) Int. Cl.
*F16H 57/04*     (2010.01)
(52) U.S. Cl.
CPC ........ *F16H 57/0436* (2013.01); *F16H 57/0427* (2013.01); *F16H 57/0479* (2013.01); *F16H 57/0476* (2013.01); *F16H 57/0484* (2013.01)

(58) Field of Classification Search
CPC . F16H 57/042; F16H 57/0426; F16H 7/0424; F16H 57/043; F16H 57/0445; F16H 57/0446; F16H 57/0479; F16H 57/0484; F16H 57/0482; F16H 57/0436; F16H 57/0427; F16H 57/0476
USPC ............................................. 475/159, 160, 5
See application file for complete search history.

(56) References Cited

U.S. PATENT DOCUMENTS

| 4,950,213 A | 8/1990 | Morisawa |
| 2003/0064846 A1* | 4/2003 | Klemen et al. ................... 475/5 |
| 2011/0319215 A1 | 12/2011 | Katoh et al. |

FOREIGN PATENT DOCUMENTS

| JP | 49-38868 | 4/1974 |
| JP | 60-60369 A | 4/1985 |

(Continued)

OTHER PUBLICATIONS

International Search Report dated Nov. 27, 2012 issued in corresponding application No. PCT/JP2012/075799.

*Primary Examiner* — Colby M Hansen
(74) *Attorney, Agent, or Firm* — Westerman, Hattori, Daniels & Adrian, LLP (57) ABSTRACT

To a side surface of the rotor on a pump side is formed with a tubular unit which extends towards the pump side, and an oil reservoir unit which accumulates a lubricating oil discharged from the pump is provided to an inner peripheral surface of the tubular unit. To the oil reservoir unit, a communicating hole which communicates the oil reservoir unit and a side surface of the rotor on a planetary gear mechanism side, is formed. The lubricating oil flowing from the oil reservoir unit via the communicating hole is guided to a carrier of the planetary gear mechanism.

5 Claims, 4 Drawing Sheets

(56) References Cited

FOREIGN PATENT DOCUMENTS

| JP | 2-107859 A | 4/1990 |
| JP | 2-168064 A | 6/1990 |
| JP | 7-76229 A | 3/1995 |
| JP | 2009-250422 A | 10/2009 |
| JP | 2010-105451 A | 5/2010 |
| JP | 2010-149764 A | 7/2010 |
| JP | 2010-184557 A | 8/2010 |
| JP | 2010-203493 A | 9/2010 |

* cited by examiner

FLOW OF LUBRICATING OIL

FIG.3B

FLOW OF LUBRICATING OIL

FIG.4

LUBRICATING STRUCTURE OF TRANSMISSION

TECHNICAL FIELD

The present invention relates to a lubricating structure of a transmission equipped with a planetary gear mechanism.

PRIOR ART

Conventionally, a transmission on which a pump, an electric motor, and a planetary gear mechanism are disposed on a shaft to which a motive power of an engine (an internal combustion engine) as a driving source is transmitted, from the engine side, is known (for example, refer to Patent Literature 1). The planetary gear mechanism is configured from a sun gear, a ring gear, and a carrier pivotally supporting a pinion intermeshed with the sun gear and the ring gear in such a way that the pinion can rotate and revolve freely.

The transmission of Patent Literature 1 is provided with a bearing which supports the carrier of the planetary gear mechanism by a support wall of a transmission case, between the electric motor and the planetary gear mechanism, and is configured such that a lubricating oil, which is discharged from a pump and which flows in an oil passage within a shaft, is supplied to the carrier via the bearing. By doing so, a route of the flow of the lubricating oil from the pump to the carrier may be made shorter, and it becomes possible to effectively lubricate the carrier and the pinion.

CITATION LIST

Patent Literature

Patent Literature 1: Japanese Patent Application Laid-Open No. 2010-105451

SUMMARY OF INVENTION

Technical Problem

The object of the present invention is to provide a lubricating structure of a transmission capable of lubricating a carrier and a pinion more effectively than in the conventional technique.

Solution to Problem

In order to achieve the above-mentioned object, the present invention provides a lubricating structure of a transmission, comprising: an input shaft to which a motive power of a driving source is transmitted; an output member which outputs the motive power; a rotating electric machine including a stator and a rotor; a planetary gear mechanism including a carrier and a pinion pivotally supported by the carrier so as to be capable of rotating freely, and which is adjacent to the rotating electric machine; and a pump adjacent to the rotating electric machine, so as to interpose the rotating electric machine between the planetary gear mechanism, wherein a tubular unit which extends towards the pump side is formed to a side surface of the rotor on the pump side, and an oil reservoir unit which accumulates a lubricating oil discharged from the pump, is provided to an inner peripheral surface of the tubular unit, the oil reservoir unit is provided with a communicating hole which communicates the oil reservoir unit with a side surface of the rotor on the planetary gear mechanism side, so as to guide the lubricating oil accumulated in the oil reservoir unit to the side surface of the rotor on the planetary gear mechanism side, and the lubricating oil flowing from the oil reservoir unit via the communicating hole is guided to the carrier of the planetary gear mechanism.

According to the present invention, the lubricating oil discharged from the pump is first accumulated in the oil reservoir unit provided to the rotor. Thereafter, the lubricating oil in the oil reservoir unit is supplied to the carrier through the communicating hole. Therefore, compared to a case where the lubricating oil is supplied to the carrier through an oil passage inside a shaft such as the input shaft, a supply route of the lubricating oil from the pump to the carrier may be shortened, and it becomes possible to efficiently lubricate the carrier and the pinion pivotally supported by the carrier.

Further, the lubricating oil is supplied to the carrier via the communicating hole, after being accommodated in the oil reservoir unit. Therefore, the amount of the lubricating oil supplied to the carrier may be stabilized, without receiving an influence of a variation of the discharge amount of the lubricating oil, from an influence of an intermittent actuation of the pump and the like.

Further, in the present invention, it is preferable that the pump is for supplying the lubricating oil to a lubricating circuit which lubricates a clutch of the transmission, and the pump is configured to have a first discharge port which discharges the lubricating oil to the lubricating circuit, and a second discharge port which is different from the first discharge port, and which discharges the lubricating oil to the oil reservoir unit.

With such configuration, it becomes possible to accumulate the lubricating oil discharged from the pump via the second discharge port directly to the oil reservoir unit, using the pump for the lubricating circuit but without the intermediary of the lubricating circuit. Therefore, it becomes possible to supply the lubricating oil to the oil reservoir unit, without being influenced by an actuation of the lubricating circuit which adjusts the supply amount of the lubricating oil to be supplied to the clutch based on the state of the clutch, so that the amount of the lubricating oil to be supplied to the carrier may be stabilized further.

Further, in the present invention, it is preferable that the carrier is provided with a receiving unit which receives the lubricating oil flowing from the communicating hole, and the side surface of the rotor on the planetary gear mechanism side is provided with a guiding unit which guides the lubricating oil flowing from the communicating hole to the receiving unit. According to such configuration, it becomes possible to supply the lubricating oil flowing from the communicating hole to the carrier more certainly.

Further, in the present invention, the tubular unit may be for installing a rotation sensor which detects a revolution speed of the rotor at an outer peripheral surface thereof. According to such configuration, by effectively utilizing a space at inner side of the tubular unit to which the rotation sensor is installed as the oil reservoir unit, it becomes possible to prevent the increase of the axis length, compared to a case where the tubular unit exclusively for the oil reservoir unit is provided.

Further, in the present invention, it is preferable that the lubricating circuit is configured by superposing two circuit members with a circuit formed on one surface, such that the surface of the circuit side face each other interposing a separate plate, the pump is accommodated in an accommodating unit provided to the circuit member, and one of the circuit member configures a part of a transmission case. According to such configuration, the lubricating circuit may be formed, by effectively utilizing a wall surface of the transmission case, and it becomes possible to suppress the number of components, compared to a case where a lubricating circuit formed independently from the transmission case is fixed to the transmission case.

Further, as the pump of the present invention, the pump driven by the driving source may be used.

DESCRIPTION OF EMBODIMENTS

Figure 1:
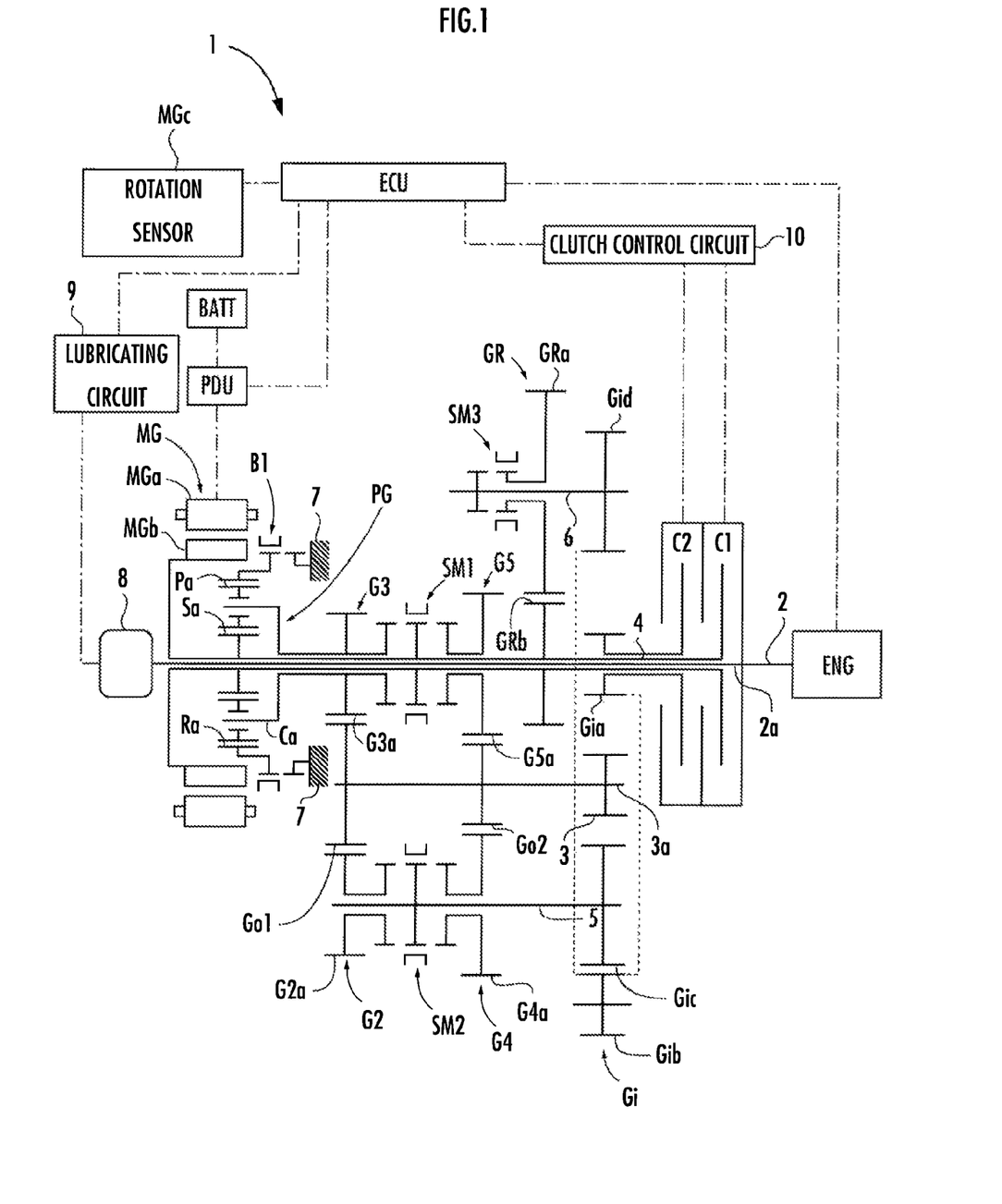
FIG. 1 is a skeleton view illustrating an embodiment of a transmission applied with a lubricating structure of the present invention.

With reference to the accompanying drawings, an embodiment of a transmission applied with a lubricating structure of the present invention will be explained. FIG. 1 illustrates an automatic transmission 1 of the present embodiment. The automatic transmission 1 is provided with an input shaft 2 to which a driving force (an output torque) of an internal combustion engine ENG composed of an engine as a driving source is transmitted, an output member 3 composed of an output gear which outputs motive power to right and left front wheels as driving wheels via a differential gear not shown, and a plurality of gear trains G2 through G5 having different gear ratios.

Further, the automatic transmission 1 is equipped with a first drive gear shaft 4 which pivotally supports drive gears G3a, G5a rotationally of respective odd-numbered gear trains G3, G5 for establishing odd-numbered speeds in the gear ratio order, a second drive gear shaft 5 which pivotally supports drive gears G2a, G4a rotationally of respective even-numbered gear trains G2, G4 for establishing even-numbered speeds in the gear ratio order, and a reverse shaft 6 which pivotally supports a reverse drive gear GRa rotationally of a reverse gear train GR, which is used for establishing a reverse speed, and which is configured from the reverse drive gear GRa and a reverse driven gear GRb. The first drive gear shaft 4 is disposed at the same axis line as the input shaft 2, and the second drive gear shaft 5 is disposed in parallel to the first drive gear shaft 4.

Further, the automatic transmission 1 is equipped with an idle gear train Gi, which is configured from an idle drive gear Gia which is pivotally supported on the first drive gear shaft 4 rotationally, a first idle driven gear Gib which is configured to intermesh with the idle drive gear Gia, a second idle driven gear Gic which is configured to intermesh with the first idle driven gear Gib and which is fixed to the second drive gear shaft 5, and a third idle driven gear Gid which is configured to intermesh with the first idle driven gear Gib and which is fixed to the reverse shaft 6.

The automatic transmission 1 is equipped with a first clutch C1 and a second clutch C2 that are configured from a wet friction clutch of a hydraulically-actuated type. The first clutch C1 is configured so as to freely switch between a transmission state of transmitting the driving force of the internal combustion engine ENG, which is transmitted to the input shaft 2, to the first drive gear shaft 4, and a released state in which the driving force transmission is disabled. The second clutch C2 is configured so as to freely switch between a transmission state of transmitting the driving force of the internal combustion engine ENG, which is transmitted to the input shaft 2, to the second drive gear shaft 5, and a released state in which the driving force transmission is disabled.

The states of both clutches C1 and C2 are switched by a hydraulic pressure supplied from a clutch control circuit 10. Further, both clutches C1 and C2 may adjust a fastening pressure in the transmission state (may realize a so-called half-clutch state), by adjusting the hydraulic pressure with an actuator (not shown) equipped by the clutch control circuit 10.

A lubricating circuit 9 is provided with a lubricating oil from a pump 8, and the lubricating circuit 9 is equipped with an oil passage which distributes the lubricating oil to portions in the automatic transmission 1 which requires lubrication, such as the clutches C1 and C2. The pump 8 is arranged coaxially to the input shaft 2, on an end on the opposite side to the internal combustion engine ENG, and is driven by the internal combustion engine ENG via a pump shaft 2a connected to the input shaft 2 through an inner side of the hollow first drive gear shaft 4.

The lubricating circuit 9 is disposed at the same axis line as the input shaft 2 and on the end portion on the opposite side from the internal combustion engine ENG, similar to the pump 8. As is shown in FIG. 3A and FIG. 3B, the lubricating circuit 9 is configured by overlapping two circuit members 91, 92 on which circuits 91a, 91b, 92a, and 92b are formed on one surface, such that the surfaces of the circuits 91a, 91b, 92a, and 92b side face each other across a separate plate 93.

91a, 92a illustrate a circuit portion forming a feed oil passage of a feeding side of the lubricating oil from the pump 8, and 91b, 92b illustrates a circuit portion forming a return oil passage of a returning side of the lubricating oil to the pump 8. Further, to the lubricating circuit 9, an accommodating unit 94 for accommodating the pump 8, a supply port 95 for supplying the lubricating oil to an interior of the shaft of the input shaft 2 of the automatic transmission 1 and the like, and a valve (not shown) for adjusting a supply amount of the lubricating oil to the first clutch C1 and the second clutch C2.

One of the supply port 95 is connected to an in-shaft oil passage entrance 96 (left-end side of the pump shaft 2a in FIG. 2, an upper left portion in FIG. 3A), via an oil passage not shown. By doing so, the lubricating oil is supplied to the clutches C1, C2 and interior of the shaft of the first drive gear shaft 4. In FIG. 3, a state where a part of the circuit of the circuit members 91, 92 is covered by a separate plate 93 is shown.

Figure 2:
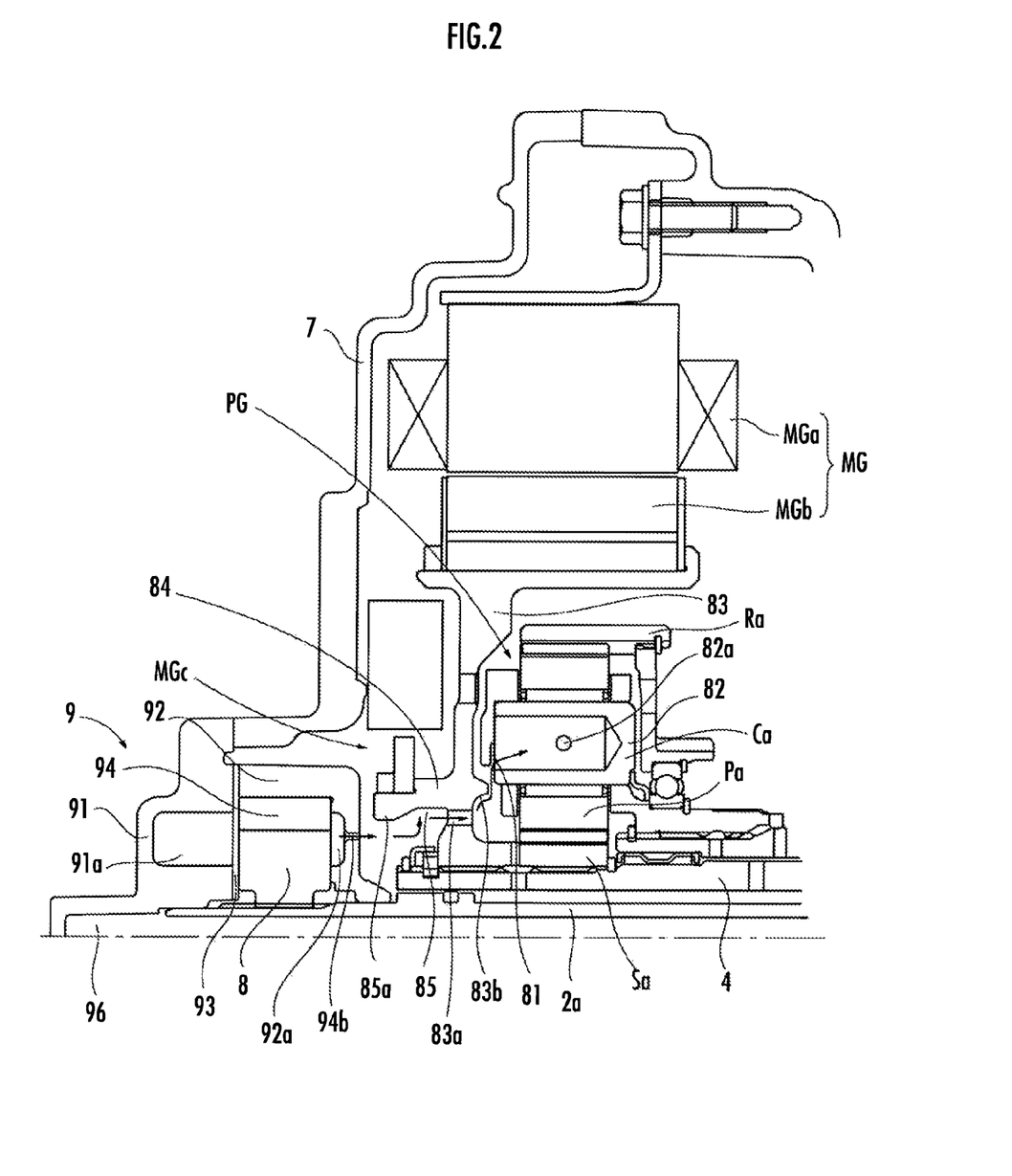
FIG. 2 is a cross-sectional view enlarging and illustrating a portion of a rotor and a planetary gear mechanism of the present embodiment.
Figure 3A:
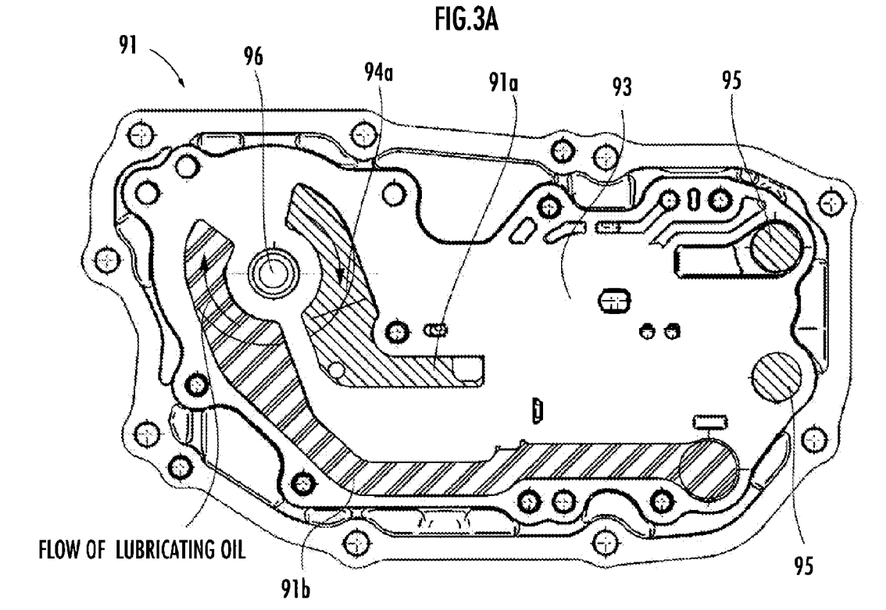
FIG. 3A and FIG. 3B are explanatory views illustrating a lubricating circuit of the present embodiment.
Figure 3B:
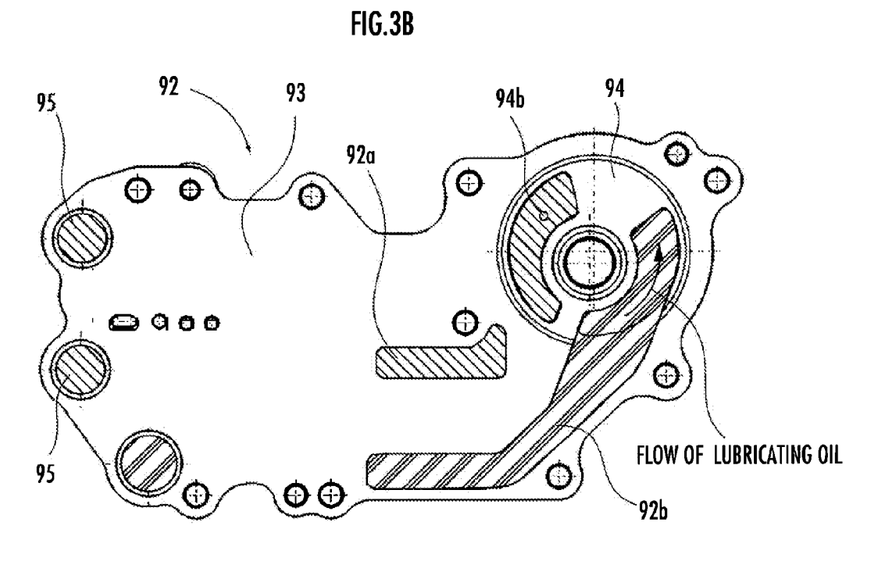
Figure 4:
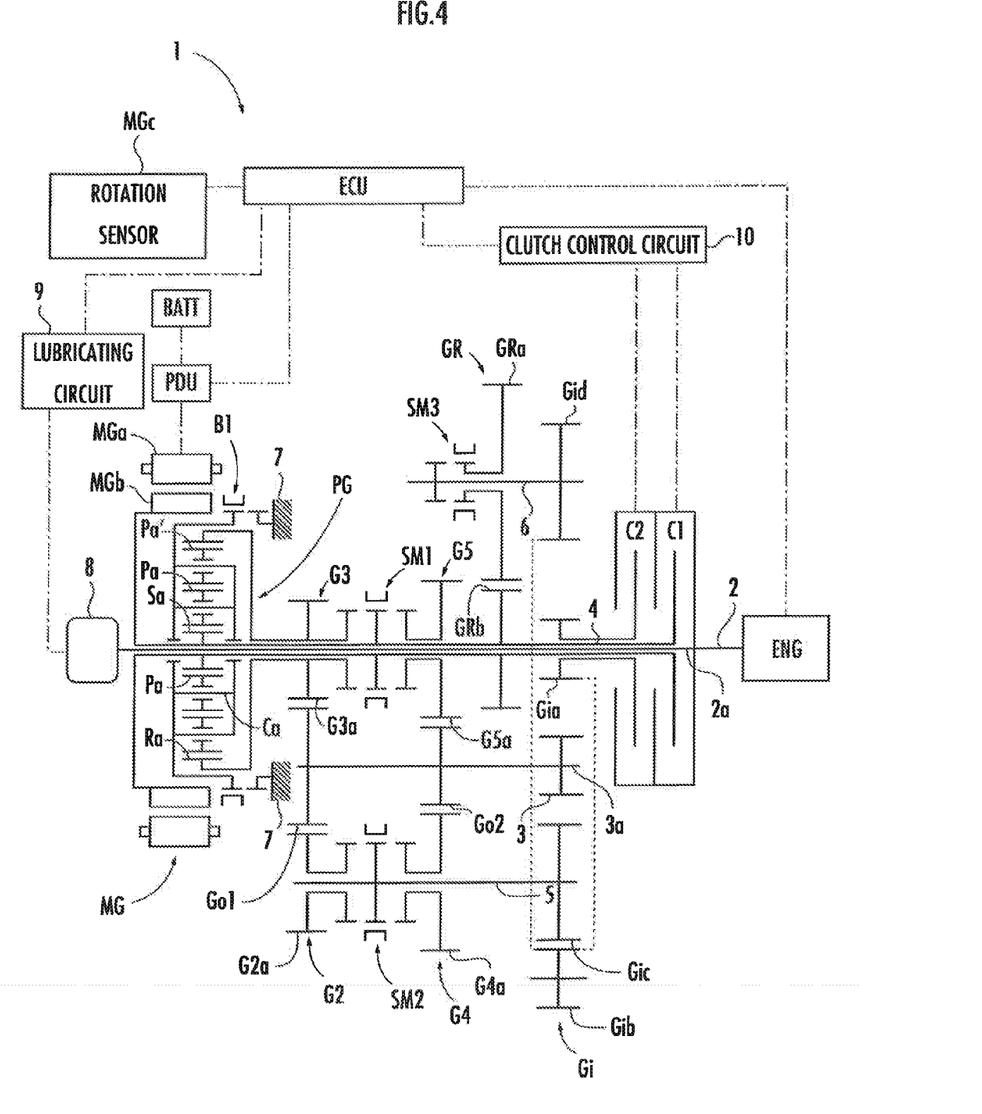
FIG. 4 is a skeleton view illustrating an embodiment of a transmission applied with a lubricating structure of another embodiment of the present invention.

The circuit member 91 illustrated in FIG. 3A constitutes a part of a transmission case 7, as is apparent from FIG. 2. By using the circuit member 91 as a part of the transmission case 7 as is explained above, stated otherwise, by forming the circuit 91a to the transmission case 7 and constituting one of the circuit member 91 of the lubricating circuit 9 with a part of the transmission case 7, a part of the transmission case 7 has a combined function as one of the circuit member 91. Therefore, according to the automatic transmission 1 of the present embodiment, it becomes possible to suppress the number of components, compared to the conventional technique in which the lubricating circuit configured by superposing two circuit members with the oil passage formed so as to interpose the separate plate is attached to the transmission case.

An accommodating unit 94 is provided with a first discharge port 94a which ejects the lubricating oil to the lubricating circuit 9. Further, the accommodating unit 94 is provided with a second discharge port 94b which is different from the first discharge port 94a. The second discharge port 94b discharges the lubricating oil towards an oil reservoir unit 85.

Further, to the automatic transmission 1, a planetary gear mechanism PG is arranged coaxially with the input shaft 2, at a position further to the internal combustion engine ENG side than the pump 8. The planetary gear mechanism PG is configured from a single-pinion type composed of a sun gear Sa, a ring gear Ra, and a carrier Ca pivotally supporting a pinion Pa intermeshed with the sun gear Sa and the ring gear Ra in such a way that the pinion can rotate and revolve freely.

If the three elements composed of the sun gear Sa, the carrier Ca and the ring gear Ra of the planetary gear mechanism PG are arranged in the order of intervals relative to gear ratios in a collinear chart (a diagram illustrating relative rotation velocities of each element by straight lines), as a first element, a second element, and a third element from the sun gear Sa side, then the first element is the sun gear Sa, the second element is the carrier Ca, and the third element is the ring gear Ra.

Further, a gear ratio of the planetary gear mechanism PG (number of teeth of the ring gear Ra/number of teeth of the sun gear Sa) is given as g, then, a ratio of a distance between the sun gear Sa which is the first element and the carrier Ca which is the second element with respect to a distance between the carrier Ca which is the second element and the ring gear Ra which is the third element is g: 1.

The sun gear Sa which is the first element is fixed on the first drive gear shaft 4. The carrier Ca which is the second element is coupled with a 3rd-speed drive gear G3a of a 3rd-speed gear train G3. The ring gear Ra which is the third element is releasably fixed to a transmission case 7 by a lock mechanism B1.

To an end portion on the pump 8 side of the carrier Ca (the second element), a receiving unit 81 is provided so as to receive the lubricating oil which is scattered from an inner side in a radial direction. Further, a shaft portion 82 which supports the pinion Pa of the carrier Ca (the second element) is formed in a bottomed tubular shape with the pump 8 side being opened, and the lubricating oil received by the receiving unit 81 is guided into the shaft portion 82.

The shaft portion 82 is provided with a piercing hole 82a which pierces in the radial direction. The lubricating oil inside the shaft portion 82 is guided to an outer peripheral surface of the shaft portion 82 via the piercing hole 82a, and lubricates a sliding surface between the carrier Ca (the second element) and the pinion Pa. The lubricating oil supplied between the carrier Ca (the second element) and the pinion Pa thereafter flows down a side surface of the pinion Pa and lubricates a portion in which the pinion Pa and the ring gear Ra (the third element) meshes.

The lock mechanism B1 is configured by a synchromesh mechanism, and is configured so as to freely switch between a fixed state of fixing the ring gear Ra (the third element) to the transmission case 7, and a released state of releasing this fixing. The lock mechanism B1 is not limited to the synchromesh mechanism, and may be configured from others, such as a two-way clutch, a wet type multi-disk brake, a hub brake, a band brake and the like.

The two-way clutch is configured to be freely switchable between either state of a reverse rotation-blocked state of allowing a normal rotation (a rotation in a forward direction) of the ring gear Ra (the third element) and blocking a reverse rotation (a rotation in a backward direction) thereof, or a normal rotation-blocked state of blocking the normal rotation and allowing the reverse rotation. When the two-way clutch is used as the lock mechanism B1, the ring gear Ra is fixed to the transmission case 7, by setting the same to the reverse rotation-blocked state in a state in which the ring gear Ra rotates reversely, or by setting the same to the forward rotation-blocked state in a state in which the ring gear Ra rotates normally.

Further, the planetary gear mechanism PG may be configured from a double-pinion type, in which a sun gear, a ring gear, and a carrier pivotally supporting a pair of pinions intermeshing with each other, one of the pair of pinions intermeshed with the sun gear and the other of the pair of pinions intermeshed with the ring gear, in such a way that the pair of pinions can rotate and revolve freely. In this case, for example, it may be configured that the sun gear (the first element) is fixed to the first drive gear shaft 4, the ring gear (the second element) is coupled to the 3rd-speed drive gear Gia of the 3rd-speed gear train G3, and the carrier (the third element) is releasably fixed to the transmission case 7 by the lock mechanism B1.

An electric motor MG (a motor generator) as a rotating electrical machine which is hollow inside is disposed outside to the planetary gear mechanism PG in the radial direction. In other words, the planetary gear mechanism PG is disposed inside the hollow electric motor MG. The electric motor MG is provided with a stator MGa and a rotor MGb. The rotor MGb is equipped with a rotor hub 83, which is positioned between the pump 8 and the planetary gear mechanism PG, and which extends towards the input shaft 2 side. The rotor hub 83 is splined to the first drive gear shaft 4.

A tubular unit 84 which extends towards the pump 8 side is formed to a side surface of the rotor hub 83 on the pump 8 side. A rotation sensor MGc composed of a resolver is provided to an outer peripheral surface of the tubular unit 84. The rotation sensor MGc is not limited to the resolver, and other sensor (for example, a rotary encoder) may be used.

A barrier unit 85a which protrudes towards inwards in a radial direction is provided to a leading end edge in an extending direction of the tubular unit 84. A space partitioned by the barrier unit 85a, an inner peripheral surface of the tubular unit 84, and the side surface of the rotor hub 83 on the pump 8 side becomes the oil reservoir unit 85 of the present embodiment in which the lubricating oil is accumulated. As is explained above, by providing the oil reservoir unit 85 to the inner peripheral surface of the tubular unit 84 in which the rotation sensor MGc is provided, it becomes possible to effectively utilize the space on the inner side of the tubular unit 84 to which the rotation sensor MGc is provided, and it becomes possible to prevent the increase of the axial length of the transmission 1, compared to a case where a tubular unit exclusively for an oil end portion is provided separately.

A communicating hole 83a which communicates the oil reservoir unit 85 and a side surface of the rotor hub 83 on the planetary gear mechanism PG side, is provided to the rotor hub 83. The lubricating oil accumulated in the oil reservoir unit 85 is introduced to the side surface of the rotor hub 83 on the planetary gear mechanism PG side, via the communicating hole 83a. An annular guiding unit 83b which smoothly expands in diameter towards the receiving unit 81 so as to guide the lubricating oil introduced from the communicating hole 83a to the receiving unit 81 of the carrier Ca (the second element), is provided to the side surface of the rotor hub 83 on the planetary gear mechanism PG side. With the guiding unit 83b and the receiving unit 81, it becomes possible to surely supply the lubricating oil flowing from the communicating hole 83a to the carrier Ca (the second element).

Further, the electric motor MG is controlled via a power drive unit PDU (Power Drive Unit) on the basis of an instruction signal from a power control device ECU (Electronic Control Unit). The power control device ECU is configured to appropriately switch the power drive unit PDU between a driving state where the electric motor MG is driven by consuming an electric power from a secondary battery BATT, and a regenerative state where the secondary battery BATT is charged via the power drive unit PDU by the electric power generated by restricting the rotating force of the rotor MGb.

Further, the electric motor MG is provided with a rotation sensor MGc, which detects a revolution speed of the electric motor MG (a revolution speed of the rotor MGb), and the rotation sensor MGc is configured so as to freely transmit the detected revolution speed of the electric motor MG to the power control device ECU.

A reverse driven gear GRb, which intermeshes with the reverse drive gear GRa of a gear train GR for a reverse stage pivotally supported by the reverse shaft 6 rotatively, is fixed to the first drive gear shaft 4. A first driven gear Go1, which intermeshes with the 2nd-speed drive gear G1a and the 3rd-speed drive gear Gia, is fixed to the output shaft 3a axially supporting the output member 3. Further, a second driven gear Go2, which intermeshes with the 4th-speed drive gear G4a and the 5th-speed drive gear G5a, is fixed to the output shaft 3a.

As above-mentioned, by configuring a single gear Go1 as a driven gear for the 2nd-speed gear train G2 and the 3rd-speed gear train G3 and a single gear Go2 as a driven gear for the 4th-speed gear train G4 and the 5th-speed gear train G5, respectively, it is possible to reduce the shaft length of the automatic transmission, which makes it more convenient to mount the automatic transmission to an FF (Front-Engine Front-Wheel Drive) type vehicle.

A first intermeshing mechanism SM1, which is configured from a synchromesh mechanism, and which is freely switchable between any one of the states of a 3rd-speed side coupled state in which the 3rd-speed drive gear G3a and the first drive gear shaft 4 are coupled, a 5th-speed side coupled state in which the 5th-speed drive gear G5a and the first drive gear shaft 4 are coupled, and a neutral state in which the coupling of the 3rd-speed drive gear G3a and the 5th-speed drive gear G5a to the first drive gear shaft 4 are uncoupled, is provided to the first drive gear shaft 4.

A second intermeshing mechanism SM2, which is configured from a synchromesh mechanism, and which is freely switchable between any one of the states of a 2nd-speed side coupled state in which the 2nd-speed drive gear G1a and the second drive gear shaft 5 are coupled, a 4th-speed side coupled state in which the 4th-speed drive gear G4a and the second drive gear shaft 5 are coupled, and the neutral state in which the coupling of the 2nd-speed drive gear G2a and the 4th-speed drive gear G4a to the second drive gear shaft 5 are uncoupled, is provided to the second drive gear shaft 5.

A third intermeshing mechanism SM3, which is configured from a synchromesh mechanism, and which is freely switchable between any one of the states of a coupled state in which the reverse drive gear GRa and the reverse shaft 6 are coupled, and the neutral state in which the coupling is uncoupled, is provided to the reverse shaft 6.

Further, the power control device ECU switches the transmission state and the released state of both clutches C1 and C2, by controlling the actuator (not shown) of the clutch control circuit 10, and adjusting the hydraulic pressure.

Hereinafter, the operations of the automatic transmission 1 having the configuration mentioned in the above will be described. In the automatic transmission 1 of the first embodiment, by engaging the first clutch C1, it is possible to start the internal combustion engine ENG by using the driving force from the electric motor MG.

In a case of establishing a first gear speed by using the driving force of the internal combustion engine ENG, the ring gear Ra of the planetary gear mechanism PG is fixed to the transmission case 7 by setting the lock mechanism B1 to a fixed state, and the first clutch C1 is engaged to enable the transmission state.

The driving force of the internal combustion engine ENG is input to the sun gear Sa of the planetary gear mechanism PG via the input shaft 2, the first clutch C1, and the first drive gear shaft 4, and is transmitted to the 3rd-speed drive gear G3a via carrier Ca with the revolution speed of the internal combustion engine ENG input to the input shaft 2 being reduced to $1/(g+1)$.

The driving force transmitted to the 3rd-speed drive gear G3a is output from the output member 3 via the first driven gear Go1 and the output shaft 3a with the revolution speed thereof being shifted to $1/i(g+1)$, and the first gear speed is established. Herein, "i" is referred to as a gear ratio of the 3rd-speed gear train G3 configured from the 3rd-speed drive gear G3a and the first driven gear Go1 (the number of teeth of the 3rd-speed drive gear G3a/the number of teeth of the first driven gear Go1).

As mentioned above, in the automatic transmission 1 of the present embodiment, it is possible to establish the first gear speed by using the planetary gear mechanism PG and the 3rd-speed gear train, therefore, there is no necessity to have a special intermeshing mechanism for establishing the first gear speed. Further, the planetary gear mechanism PG is disposed inside the hollow electric motor MG, it becomes possible to further reduce the shaft length of the automatic transmission.

In the first gear speed, if the vehicle is in a deceleration state and a charging rate SOC (State Of Charge) of the secondary battery BATT is less than a predetermined value, the power control device ECU performs a regenerative deceleration operation which generates the electric power by applying brake with the electric motor MG. Further, if the charging rate SOC of the secondary battery BATT is equal to or more than the predetermined value, it is possible for the vehicle to perform an HEV (Hybrid Electric Vehicle) traveling in which the electric motor MG is driven to assist the driving force of the internal combustion engine ENG, or an EV (Electric Vehicle) traveling in which the vehicle travels by the driving force from the electric motor MG only.

Further, when the vehicle is in the EV traveling, the deceleration of the vehicle is allowed and a vehicular velocity is equal to or greater than a predetermined velocity, by gradually engaging the first clutch C1, the internal combustion engine ENG can be started by a kinetic energy of the vehicle without using the driving force of the electric motor MG.

Further, when the power control device ECU predicts that the vehicle traveling at the first gear speed may be shifted up to the second gear speed according to vehicle information such as the vehicular velocity, a manipulated amount of an accelerator pedal and the like, the second intermeshing mechanism SM2 is set to the 2nd-speed side coupled state in which the 2nd-speed drive gear G2a and the second drive gear shaft 5 are coupled or a pre-shift state nearby the 2nd-speed side coupled state.

In a case of establishing the second gear speed by using the driving force of the internal combustion engine ENG, the second intermeshing mechanism SM2 is set to the 2nd-speed side coupled state in which the 2nd-speed drive gear G2a and the second drive gear shaft 5 are coupled, the first clutch C1 is set to the released state, and the second clutch C2 is engaged to enable the transmission state. By doing so, the driving force of the internal combustion engine ENG is output from the output member 3 via the second clutch C2, the idle gear train Gi, the second drive gear shaft 5, the 2nd-speed gear train G2, and the output shaft 3a.

In the second gear speed, when the power control device ECU predicts a shift-up in gear speed, the first intermeshing mechanism SM1 is set to the 3rd-speed side coupled state in which the 3rd-speed drive gear G3a and the first drive gear shaft 4 are coupled or a pre-shift state nearby the 3rd-speed side coupled state.

On the other hand, when the power control device ECU predicts a shift-down in the gear speed, the first intermeshing mechanism SM1 is set to the neutral state in which the 3rd-speed drive gear G3a and the 5th-speed drive gear G5a are uncoupled from the first drive gear shaft 4.

By doing so, only by setting the first clutch C1 at the transmission state and the second clutch 2 at the released state, it is possible to perform the shift-up or the shift-down to switch the gear speed smoothly without interrupting the driving force.

Further, even in the second gear speed, the power control device ECU performs the regenerative deceleration operation, when the vehicle is in the deceleration state and the charging rate SOC of the secondary battery BATT is less than the predetermined value. In the case of performing the regenerative deceleration operation in the second gear speed, the operation is different when the first intermeshing mechanism SM1 is in the 3rd-speed side coupled state or in the neutral state.

In the case where the first intermeshing mechanism SM1 is in the 3rd-speed side coupled state, the 3rd-speed drive gear G3a is rotated by the first driven gear Go1 which is rotated by the 2nd-speed drive gear G1a, and the 3rd-speed drive gear G3a rotates the rotor MGb of the electric motor MG via the first drive gear shaft 4. Therefore, the regeneration is performed to generate the electric power by braking the rotor MGb to inhibit the revolution thereof.

In the case where the first intermeshing mechanism SM1 is in the neutral state, the lock mechanism B1 is set to the fixed state so as to set the revolution speed of the ring gear Ra to "0". Further, the carrier Ca rotating together with the 3rd-speed drive gear G3a which intermeshes with the first driven gear Go1 is braked by making the electric motor MG which is coupled to the sun gear Sa to generate the electric power, so that the regeneration is performed.

To achieve the HEV traveling at the second gear speed, for example, the driving force of the electric motor MG is transmitted to the output member 3 via the 3rd-speed gear train G3 under the condition that each rotating element in the planetary gear mechanism PG is in a lock state of being unable to make relative rotation, which is achieved by setting the first intermeshing mechanism SM1 to the 3rd-speed side coupled state in which the 3rd-speed drive gear G3a and the first drive gear shaft 4 are coupled. Or, by setting the first intermeshing mechanism SM1 to the neutral state, setting the lock mechanism B1 to a reverse rotation-blocked state so that the revolution speed of the ring gear Ra is equal to "0", and transmitting the driving force of the electric motor MG to the first driven gear Go1 via the first gear speed path, the HEV traveling at the second gear speed is achieved.

In a case of establishing the third gear speed by using the driving force of the internal combustion engine ENG, the first intermeshing mechanism SM1 is set to the 3rd-speed side coupled state in which the 3rd-speed drive gear G3a and the first drive gear shaft 4 are coupled, the second clutch C2 is set to the released state, and the first clutch C1 is engaged to enable the transmission state. By doing so, the driving force of the internal combustion engine ENG is transmitted to the output member 3 via the input shaft 2, the first clutch C1, the first drive gear shaft 4, the first intermeshing mechanism SM1, and the 3rd-speed gear train G3, and is output at a revolution speed of 1/i of the engine revolution speed.

In the third gear speed, since the first intermeshing mechanism SM1 is set to the 3rd-speed side coupled state in which the 3rd-speed drive gear G-3a and the first drive gear shaft 4 are coupled, the sun gear Sa and the carrier Ca of the planetary gear mechanism PG rotate identically.

Therefore, each rotating element of the planetary gear mechanism PG is in the locked state of being unable to rotate relatively, so that the regenerative deceleration is performed by braking the sun gear Sa at the electric motor MG, and HEV traveling is performed when the driving force of the electric motor MG is transmitted to the sun gear Sa. Moreover, it is possible to perform the EV traveling of traveling by the driving force from the electric motor MG only, by releasing the first clutch C1.

In the third gear speed, when the power control device ECU predicts a shift-down in the gear speed according to the vehicle information such as the vehicular velocity, the manipulated amount of the accelerator pedal and the like, the second intermeshing mechanism SM2 is set to the 2nd-speed side coupled state in which the 2nd-speed drive gear G2a and the second drive gear shaft 5 are coupled or a pre-shift state nearby the 2nd-speed side coupled state. When the power control device ECU predicts a shift-up in the gear speed, the second intermeshing mechanism SM2 is set to the 4th-speed side coupled state in which the 4th-speed drive gear G4a and the second drive gear shaft 5 are coupled or a pre-shift state nearby the 4th-speed side coupled state.

By doing so, only by engaging the second clutch C2 to the transmission state and releasing the first clutch C1 to the released state, it is possible to perform the gear shifting so as to shift gears smoothly without interrupting the driving force.

In a case of establishing the fourth gear speed using the driving force of the internal combustion engine ENG, the second intermeshing mechanism SM2 is set to the 4th-speed side coupled state in which the 4th-speed drive gear G4a and the second drive gear shaft 5 are coupled, the first clutch C1 is set to the released state, and the second clutch C2 is engaged to enable the transmission state.

During traveling at the fourth gear speed, when the power control device ECU predicts a shift-down in the gear speed according to the vehicle information, the first intermeshing mechanism SM1 is set to the 3rd-speed side coupled state in which the 3rd-speed drive gear G3a and the first drive gear shaft 4 are coupled or to a pre-shift state nearby the 3rd-speed side coupled state.

On the other hand, when the power control device ECU predicts a shift-up in the gear speed according to the vehicle information, the first intermeshing mechanism SM1 is set to the 5th-speed side coupled state in which the 5th-speed drive gear G5a and the first drive gear shaft 4 are coupled or to a pre-shift state nearby the 5th-speed side coupled state. By doing so, only by engaging the first clutch C1 to the transmission state and releasing the second clutch C2 to the released state, it is possible to perform the shift-up or the shift-down in the gear speed so as to shift gears smoothly without interrupting the driving force.

In case the regenerative deceleration or the HEV traveling is performed during traveling at the fourth gear speed, when the power control device ECU predicts a shift-down, the first intermeshing mechanism SM1 is set to the 3rd-speed side coupled state in which the 3rd-speed drive gear G3a and the first drive gear shaft 4 are coupled, the regenerative deceleration is achieved if the electric motor MG is braked and the HEV traveling is achieved if the driving force of the electric motor MG is transmitted.

When the power control device ECU predicts a shift-up, the first intermeshing mechanism SM1 is set to the 5th-speed side coupled state in which the 5th-speed drive gear G5a and the first drive gear shaft 4 are coupled, the regenerative deceleration is achieved if the electric motor MG is braked and the HEV traveling is achieved if the driving force of the electric motor MG is transmitted.

In a case of establishing the fifth gear speed by using the driving force of the internal combustion engine ENG, the first intermeshing mechanism SM1 is set to the 5th-speed side coupled state in which the 5th-speed drive gear G5a and the first drive gear shaft 4 are coupled, the second clutch C2 is set to the released state, and the first clutch C1 is engaged to enable the transmission state. In the fifth gear speed, since the internal combustion engine ENG and the electric motor MG are in a directly-coupled state since the first clutch C1 is set to the transmission state, HEV traveling is achieved when the driving force is output from the electric motor MG, and the regenerative deceleration is achieved when the electric motor MG is braked to generate electricity.

To achieve the EV traveling at the fifth gear speed, the first clutch C1 should be set to the released state in addition to the second clutch C2. Moreover, during EV traveling at the fifth gear speed, it is possible to start the internal combustion engine ENG by gradually engaging the first clutch C1.

When the power control device ECU predicts a shift-down to the fourth gear speed according to the vehicle information during traveling at the fifth gear speed, the second intermeshing mechanism SM2 is set to the 4th-speed side coupled state in which the 4th-speed drive gear G4a and the second drive gear shaft 5 are coupled or a pre-shift state nearby the 4th-speed side coupled state. By doing so, it is possible to perform shift-down to the fourth gear speed smoothly without interrupting the driving force.

In a case of establishing the reverse gear speed by using the driving force of the internal combustion engine ENG, the lock mechanism B1 is set to the fixed state, the third intermeshing mechanism SM3 is set to the coupled state in which the reverse drive gear GRa and the reverse shaft 6 are coupled, and the second clutch C2 is engaged to enable the transmission state. By doing so, the revolution speed of the input shaft 2 is shifted to a negative revolution (revolution in the reverse direction) with a revolution speed of [the number of teeth of the idle drive gear Gia/the number of teeth of the third idle driven gear Gid]×[the number of teeth of the reverse drive gear GRa/the number of teeth of the reverse driven gear GRb]×[1/i(g+1)] and output from the output member 3, to establish the reverse gear speed.

In the reverse gear speed, the regenerative deceleration is achieved if the rotor MGb rotating in the reverse rotation direction is made to generate the driving force in the normal rotation direction so as to brake the same, and the HEV traveling is achieved if the rotor MGb rotating in the reverse rotation direction is made to generate the driving force in the reverse rotation direction. Further, the reverse gear speed by the EV traveling may be established by setting both clutches C1 and C2 to the released state, setting the lock mechanism B1 to the fixed state, and reversing the electric motor MG.

According to the transmission 1 of the present embodiment, first, the lubricating oil discharged from the pump 8 is accumulated at the oil reservoir unit 85 provided to the rotor hub 83. Thereafter, the lubricating oil of the oil reservoir unit 85 is supplied to the carrier Ca (the second element) through the communicating hole 83a. Therefore, compared to a case where the lubricating oil is supplied to the carrier Ca (the second element) through the oil passage inside the shaft such as the input shaft 2 and the first drive gear shaft 4, the supply path of the lubricating oil from the pump 8 to the carrier Ca (the second element) may be made short, and the carrier Ca (the second element) and the pinion Pa that is axially supported by the carrier Ca (the second element) may be lubricated effectively.

Further, the lubricating oil is supplied, after being temporarily accumulated in the oil reservoir unit 85, to the carrier Ca (the second element) via the communicating hole 83a. Therefore, it becomes possible to stabilize the amount of the lubricating oil supplied to the carrier Ca (the second element), without receiving an influence of a pulsation of the lubricating oil from an influence such as an intermittent actuation of the pump 8 and the like.

Further, it becomes possible to accumulate the lubricating oil discharged from the pump 8 via the second discharge port 94b directly to the oil reservoir unit 85, while using the pump 8 for the lubricating circuit 9, without the intermediary of the lubricating circuit 9. In the lubricating circuit 9, the amount of the lubricating oil necessary for the clutches C1, C2 is adjusted by a valve (not shown), in order to prevent friction loss, the amount of the lubricating oil supplied through the lubricating circuit 9 varies greatly. However, in the automatic transmission 1 of the present invention, the lubricating oil may be accumulated to the oil reservoir unit 85 from the second discharge port 94b, without the intermediary of the lubricating circuit 9. Therefore, it becomes possible to further stabilize the amount of the lubricating oil supplied to the carrier Ca (the second element).

In the present embodiment, an explanation is given on the transmission using a dual clutch transmission. However, the transmission of the present invention is not limited thereto, and may be other transmission as long as the transmission is configured to have a planetary gear mechanism, a rotating electrical machine, and a pump.

Further, in the present embodiment, explanation is given on an example in which the pump 8, a rotating electrical machine MG and the planetary gear mechanism PG are arranged coaxially to the input shaft, and are disposed on the opposite side of the internal combustion engine ENG. However, the position of the pump, the rotating electrical machine, and the planetary gear mechanism of the present invention is not limited thereto. For example, the pump, the rotating electrical machine, and the planetary gear mechanism may be disposed on the side of the internal combustion engine ENG, or may be disposed on an identical axis line with an output shaft.

Further, in the present embodiment, explanation is given on the transmission 1 equipped with the rotating electrical machine MG. However, the rotating electrical machine MG may be omitted. In this case, the lubricating oil may be directly discharged to the receiving unit 81 of the carrier Ca, from the second discharge port of the pump.

Further, alternatively to the rotating electrical machine MG, clutches or gears may be disposed, and the oil reservoir unit and the piercing hole may be provided to the clutch hub or the gear.

EXPLANATION OF REFERENCES

1 . . . automatic transmission, 2 . . . input shaft, 2a . . . pump shaft, 3 . . . output member (output gear), 3a . . . output shaft, 4 . . . first drive gear shaft, 5 . . . second drive gear shaft, 6 . . . reverse shaft, 7 . . . transmission case, 8 . . . pump, 81 . . . receiving unit, 82 . . . shaft portion, 82a . . . piercing hole, 83 . . . rotor hub, 83a . . . communicating hole, 83*b* . . . guiding unit, 84 . . . tubular unit, 85 . . . oil reservoir unit, 85*a* . . . barrier unit, 9 . . . lubricating circuit, 91 . . . one of circuit member, 91*a* . . . circuit of feed oil passage, 91*b* . . . circuit of return oil passage, 92 . . . other circuit member, 92*a* . . . circuit of feed oil passage, 92*b* . . . circuit of return oil passage, 93 . . . separate plate, 94 . . . accommodating unit, 94*a* . . . first discharge port, 94*b* . . . second discharge port, 95 . . . supply port, 96 . . . in-shaft oil passage entrance, 10 . . . clutch control circuit, C1 . . . first clutch, C2 . . . second clutch, SM1 . . . first intermeshing mechanism, SM2 . . . second intermeshing mechanism, G2 . . . 2nd-speed gear train, G2*a* . . . 2nd-speed drive gear, G3 . . . 3rd-speed gear train, G3*a* . . . 3rd-speed drive gear, G4 . . . 4th-speed gear train, G4*a* . . . 4th-speed drive gear, G5 . . . 5th-speed gear train, G5*a* . . . 5th-speed drive gear, Go1 . . . first driven gear (driven gear of 2nd-speed, 3rd-speed), Go2 . . . second driven gear (driven gear of 4th-speed, 5th-speed), Gi . . . idle gear train, GR . . . reverse gear train, ECU . . . power control device, ENG . . . internal combustion engine (engine, driving source), MG . . . electric motor for traveling (motor generator, rotating electric machine), MGa . . . stator. MGb . . . rotor, MGc . . . rotation sensor, PG . . . planetary gear mechanism, Sa . . . sun gear (first element), Ca . . . carrier (second element), Ra . . . ring gear (third element), BATT . . . secondary battery.

The invention claimed is:

1. A lubricating structure of a transmission, comprising:
an input shaft to which a motive power of a driving source is transmitted;
an output member which outputs the motive power;
a rotating electric machine including a stator and a rotor;
a planetary gear mechanism including a carrier and a pinion pivotally supported by the carrier so as to be capable of rotating freely, and which is adjacent to the rotating electric machine; and
a pump adjacent to the rotating electric machine, so as to interpose the rotating electric machine between the planetary gear mechanism and the pump,
wherein a tubular unit which extends towards a pump side is formed to a side surface of the rotor on the pump side,
wherein an oil reservoir unit which accumulates a lubricating oil discharged from the pump is provided as a space partitioned by a barrier unit, an inner peripheral surface of the tubular unit, and a pump side surface of a rotor hub,
wherein the oil reservoir unit is provided with a communicating hole which communicates the oil reservoir unit with a side surface of the rotor on a planetary gear mechanism side, so as to guide the lubricating oil accommodated in the oil reservoir unit to the side surface of the rotor on the planetary gear mechanism side,
wherein the lubricating oil flowing from the oil reservoir unit via the communicating hole is guided to the carrier of the planetary gear mechanism,
wherein the pump is configured to supply the lubricating oil to a lubricating circuit which lubricates a clutch of the transmission, and
wherein the pump is configured to have a first discharge port which discharges the lubricating oil to the lubricating circuit, and a second discharge port which is different from the first discharge port, and which discharges the lubricating oil to the oil reservoir unit.

2. The lubricating structure of the transmission according to claim 1,
wherein the carrier is provided with a receiving unit which receives the lubricating oil flowing from the communicating hole, and
wherein the side surface of the rotor on the planetary gear mechanism side is provided with a guiding unit which guides the lubricating oil flowing from the communicating hole to the receiving unit.

3. The lubricating structure of the transmission according to claim 1, wherein a rotation sensor which detects a number of revolutions of the rotor is provided to an outer peripheral surface of the tubular unit.

4. The lubricating structure of the transmission according to claim 1,
wherein the lubricating circuit is configured by superposing two circuit members each having a circuit formed on one surface thereof, such that the surfaces of the circuit members having the respective circuit formed thereon face each other interposing a separate plate,
wherein the pump is accommodated in an accommodating unit provided by the circuit members, and
wherein one of the circuit members is a part of a transmission case.

5. The lubricating structure of the transmission according to claim 1, wherein the pump is driven by the driving source.

* * * * *